Jan. 16, 1934.   G. H. HASERODT   1,943,477
MOLDING MACHINE
Filed July 14, 1932   2 Sheets-Sheet 2
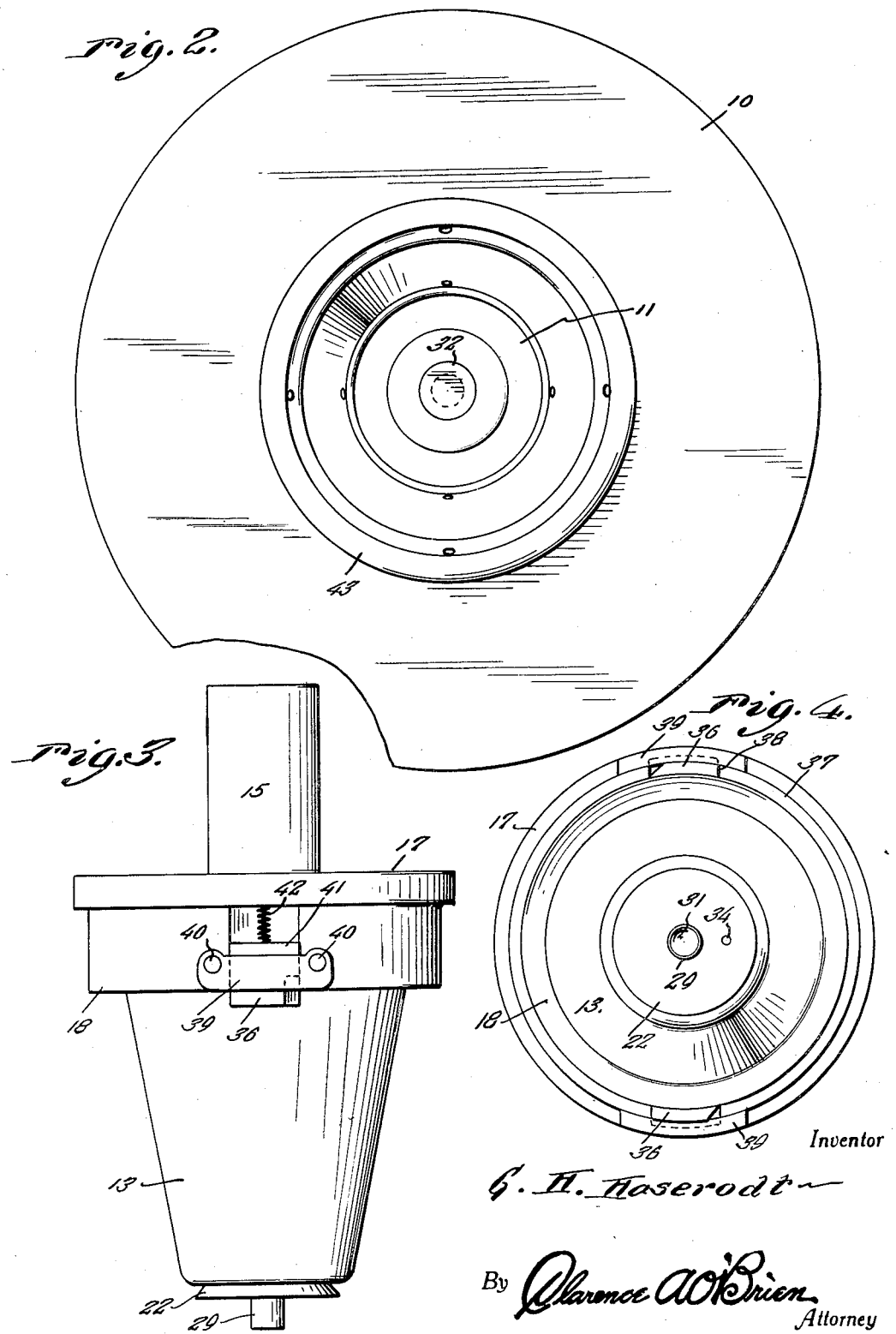
Inventor
G. H. Haserodt
By Clarence A. O'Brien
Attorney Patented Jan. 16, 1934

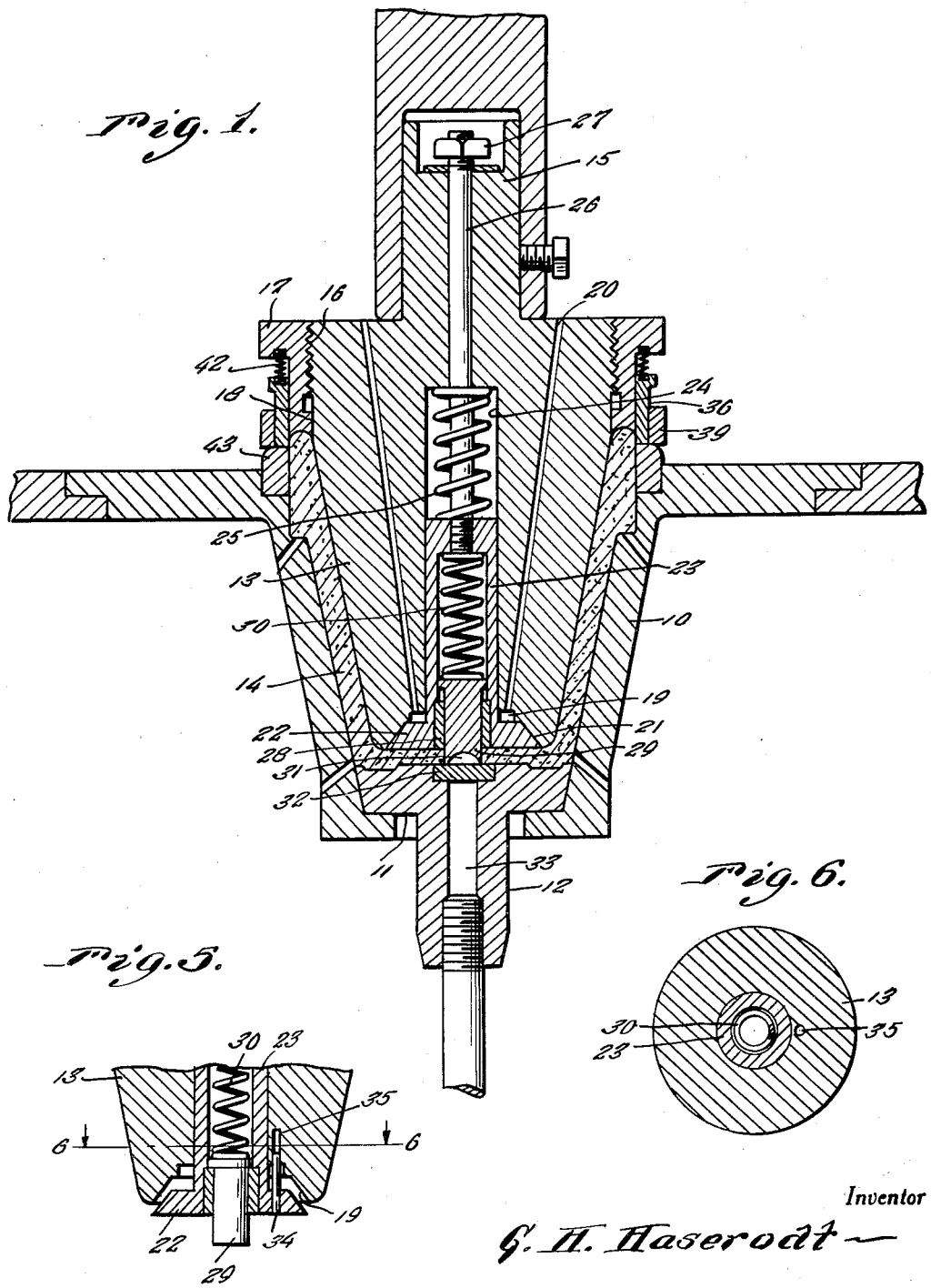

1,943,477

UNITED STATES PATENT OFFICE 1,943,477

MOLDING MACHINE

Grant H. Haserodt, Edison, Ohio

Application July 14, 1932. Serial No. 622,538

4 Claims. (Cl. 25—24)

This invention relates to machines for holding and forming flowerpots and the like of plastic material, and is an improvement over that type of machine embodying the subject matter of Patent No. 1,863,114 granted to me under date of June 14, 1932.

In the type of machine embodying the subject matter of the above mentioned patent, there is provided a mold of proper shape into which is placed plastic material to form the outside of a flower pot. A plunger of the proper shape to form the inside of the flower pot is then introduced into the mold. The plunger is usually provided with a plurality of vent holes communicating with a chamber provided adjacent the lower end of the plunger, and a valve constituting a closure for the chamber in the above mentioned machine forms the lower end portion of the plunger; and in operation it has been found that a portion of the plastic material from which the flower pot or the like is formed becomes clogged between the confronting ends of the plunger proper and the aforementioned valve forming a rib on the interior of the molded pot which, if not earlier removed, must be chipped off after the pot is baked or otherwise set or hardened, for if this rib is not removed, it would tend, when emptying the flower pot of the plant, to break or otherwise disintegrate the packed soil which, as is well known in the art is very undesirable.

In accordance with the present invention the plunger is of such improved construction, and the arrangement of the valve is such that the formation of the aforementioned rib on the molded pot is effectively guarded against.

Further, in accordance with the present invention improved means is provided for the mounting of the knives carried by the plunger for the purpose of cutting away the excess plastic material escaping between the mold and the top shaping ring.

Other objects and advantages of the present invention will be best understood from a study of the following description taken in connection with the accompanying drawings wherein:

Figure 1 is a vertical sectional view of the mold and plunger as they appear when forming the inside of a flower pot.

Figure 2 is a top plan view of the mold.

Figure 3 is an elevational view of the plunger, the valve being shown in open position.

Figure 4 is a bottom plan view of the plunger.

Figure 5 is a fragmentary vertical sectional view through the lower portion of the plunger, and Figure 6 is a sectional view taken substantially on the line 6—6 of Figure 5.

Referring more in detail to the drawings, 10 indicates a conventional form of mold having an internal shape corresponding to the outer face of the molded pot. The smaller end of the mold is provided with the base member 11 provided with the usual depending stem for use in a well known manner, whereby the base member may be pushed upwardly within the mold to free the pot from the latter after said pot has been molded.

To form the inside of the pot a plunger 13 is provided to be urged into the mold to force the plastic material into the desired shape as shown at 14.

This plunger is caused to rotate in the usual way as it is forced into the mold to facilitate the flow of the plastic material into shape and to actuate the rib removing knives hereinafter more fully referred to.

The plunger 13 is provided with a shank 15 and a threaded upper end portion 16, and screwed on the threaded portion 16 is a ring or collar 17 having a depending flange 18 whose lower edge is formed according to the configuration desired for the top or upper end of the pot. The structure just described is more fully set forth in Patent No. 1,863,114 above alluded to.

In accordance with the present invention the plunger 13 has the chamber 19 with which the inner or lower end of the vent opening 20 communicates arranged at the inner end of a substantially conical valve seat 21 provided at the smaller end of the plunger. Adapted to engage with the seat 21 when the plunger is in its final position within the mold 10 is a conical valve 22 provided with a stem 23 arranged to operate within an axial socket 24 provided in the plunger 13. The valve 22 is normally urged downwardly out of engagement with its seat 19 through the medium of a coil spring 25 bearing against the upper or inner end of the stem 23 and disposed about a rod 26 that is screw threadedly engaged with the stem 23 as shown in Figure 1. Rod 26 is slidable through an axial opening provided in the shank or stem 15 of the plunger and at its upper end is provided with a stop nut 27.

The valve 22 is provided with a central aperture into which is fitted a bushing 28 accommodating a pin 29 that is normally urged downwardly through the medium of a spring 30 arranged within the stem 23 and bearing against the inner end of the pin 29. As is well known in the art the pin 29 is used for forming the hole usually provided in the bottom of the molded flower pot. When used over a period of time the outer end of the pin 29 becomes worn almost to a point, necessitating the replacement of such pin. In order therefore to increase the life of the pin and to compensate for the wear on the outer end of the pin, I provide the latter at said outer end with a concave recess 31, so that the wearing of said end of the pin to a point is effectively guarded against.

I also propose to recess that portion of the base member with which the outer end of the pin engages, and to place in said recessed portion a removable wear plate 32 as shown in Figure 1. After one side of the wear plate 32 has become worn, the plate 32 may be readily reversed and the other side presented upwardly, and to facilitate removal of the wear plate 32 the stem 12 of the base member 11 is provided with an axial opening 33 through which a suitable instrument may be passed and forcibly engaged with the plate 32 for removing the latter in a manner thought apparent.

From the description of the invention thus far, it will be seen that with the valve 22 arranged as shown the possibility of any rib being formed internally of the molded flower pot and on the peripheral wall thereof is effectively guarded against except perhaps at the bottom of such pot where a small amount of the material 14 might accumulate between the beveled face of the valve 22 and the seat 19; however the provision of a rib at the bottom of the flower pot would obviously in no wise serve to disintegrate or break the body of dirt when effecting a removal of a plant from the flower pot.

In Figure 5 I have shown means whereby the valve 22 is retained against rotative movement, and as therein shown such means consists of a pin 34 carried by the valve and having a free end portion operating in a socket 35 provided in the lower portion of the plunger 13 and extending parallel to the axis of the plunger.

The present invention is further characterized over the molding machine shown and described in the hereinbefore referred to patent in the mounting of the aforementioned knives 36 used to cut away the excess plastic material extruding between the mold and the top shaping ring.

In my aforementioned patent these knives were held in position through the medium of a knife retaining ring removably fitted about the flange depending from the collar and secured to the flange by screws or the like. In accordance with the present invention the flange 18 is provided adjacent its lower edge with an annular rib 37 of a thickness corresponding to the thickness of the knives 36. As shown in Figures 3 and 4 the rib 37 is provided on diametrically opposite sides with slots 38 in which the knives 36 are constrained to slide vertically. The knives are slidably retained in the slots 38 through the medium of plates 39 extending across the slots and secured in position by screws or other fastening elements 40.

As is also the case in my referred to patent the knives 36 are provided at their upper edges with outwardly directed flanges 41 whereby the downward movement of said knives is limited. The knives 36 are yieldably projected below the bottom of flange or rib 37 by means of helical springs 42 which bear on top of the knives and have their upper ends suitably engaged with the collar 17 as shown in Figure 1.

The lower edges of the knives 36 under action of the springs 42 yieldably bear against the upper edge of a ring 43 provided at the top of the mold, and obviously as the plunger rotates, the material squeezed out between the mold and the lower edge of the flange 18 passes over the ring 43 where it is cut away by the knives.

It is apparent that the means for retaining the knives in accordance with the present invention is a great improvement over the means above referred to and forming part of the machine embodying the subject matter of Patent No. 1,863,114 in that the means now disclosed requires less material than is required by the use of a retaining ring; facilitates removal and replacement of a knife, permitting such removal and replacement of a knife without affecting the position of the other knife; and further provides an opening above each knife for the escape of plastic material as would otherwise collect between the knife 36 and ring 18, causing the knife and spring 42 to become clogged, thus impairing operation of the device.

Even though I have herein shown and described the preferred embodiment of the invention it is to be understood that I in no wise intend to restrict the invention beyond the requirements of the prior art and the scope of the appended claims.

Having thus described my invention, what I claim as new is:

1. A device of the class described comprising a mold, a rotary plunger movable axially into and out of the mold, a top forming collar movable with the plunger and provided adjacent its lower edge with an annular rib provided on diametrically opposite sides of the collar with slots, retaining plates removably secured to said rib and extending across said slots, and knives slidably arranged in said slots, and spring means bearing on top of the knives to yieldably project the same below said rib and retaining plates.

2. A device of the class described comprising a mold, a rotary plunger movable axially into and out of the mold, a top forming collar movable with the plunger, a plurality of knives carried by and yieldably slidable relative to said collar to cut away plastic material extruded out between said mold and said top forming collar as said plunger is rotated, and vent means for the plunger including passages extending through the plunger, a substantially circular valve seat provided in the bottom end of the plunger, and a valve slidably carried by the plunger and engageable with said seat, said valve having a bottom face in the plane of the bottom face of said plunger when the valve is engaged with said seat.

3. A device of the class described comprising a mold, a rotary plunger movable axially into and out of the mold, a top forming collar movable with the plunger, a plurality of knives carried by and yieldably slidable relative to said collar to cut away plastic material extruded out between said mold and said top forming collar as said plunger is rotated, and vent means for the plunger including passages extending through the plunger, a substantially circular valve seat provided in the bottom end of the plunger, and a valve slidably carried by the plunger and engageable with said seat, said valve having a bottom face in the plane of the bottom face of said plunger when the valve is engaged with said seat, and a hole forming pin carried by the plunger and slidable axially relative to the valve, said hole forming pin having an outer end provided with a concave recess.

4. A device of the class described comprising a mold, a rotary plunger movable axially into and out of the mold, a top forming collar movable with the plunger, and provided on relatively opposite sides with slots, a knife constrained to shift longitudinally of the collar in each slot, retaining plates removably secured to the collar and extending across said slots, flanges on the upper edges of said knives engageable with said retaining plates, springs bearing on the tops of the knives to yieldably project the same below said collar and retaining plates, to cut away plastic material extruded out between said mold and said collar as said plunger is rotated.

GRANT H. HASERODT.